United States Patent [19]
Wu et al.

[11] Patent Number: 6,109,690
[45] Date of Patent: Aug. 29, 2000

[54] PIVOTING SEAT BACK

[75] Inventors: Wei-Pin Wu, Canton; John J. Flannery, Fenton; Robert H. Dietze, Sr., Brighton; Joseph P. Vitale, South Lyon; Mark A. Pattok, Canton; Jeffrey A. Lindberg, Southgate; Robert M. Healy, Garden City, all of Mich.

[73] Assignee: Johnson Controls Technology Company, Plymouth, Mich.

[21] Appl. No.: 09/216,658

[22] Filed: Dec. 18, 1998

[51] Int. Cl.[7] ....................................................... B60N 2/42
[52] U.S. Cl. ................... 297/216.13; 297/378.11; 297/216.14
[58] Field of Search ......................... 297/216.14, 216.13, 297/378.11, 374, 354.1, 354.11, 468, 216.12, 216.19

[56] References Cited

U.S. PATENT DOCUMENTS

| | | | |
|---|---|---|---|
| 3,357,736 | 12/1967 | McCarthy | 297/216.19 |
| 5,366,269 | 11/1994 | Beauvais | 297/216.19 |
| 5,378,043 | 1/1995 | Viano et al. | |
| 5,437,494 | 8/1995 | Beauvais | |
| 5,449,214 | 9/1995 | Totani | |
| 5,490,706 | 2/1996 | Totani | |
| 5,636,424 | 6/1997 | Singer et al. | 297/216.19 |
| 5,676,421 | 10/1997 | Brodsky | 297/216.13 |
| 5,722,722 | 3/1998 | Massara | 297/216.14 |
| 5,836,648 | 11/1998 | Karschin et al. | 297/216.14 |

*Primary Examiner*—Anthony D. Barfield
*Attorney, Agent, or Firm*—Harness, Dickey & Pierce, P.L.C.

[57] ABSTRACT

A vehicle seat assembly having a seat back which pivots during a rear impact vehicle collision in Such a manner that the upper end of the seat back rotates foreword. The pivoting seat back includes a releasable latch mechanism to hold the seat back frame fixed in a predetermined position about a pivot axis. The latch mechanism is releasable by inertia forces in response to a rear vehicle collision, to release the latch member and free the seat back frame for rotation about the pivot axis.

46 Claims, 6 Drawing Sheets

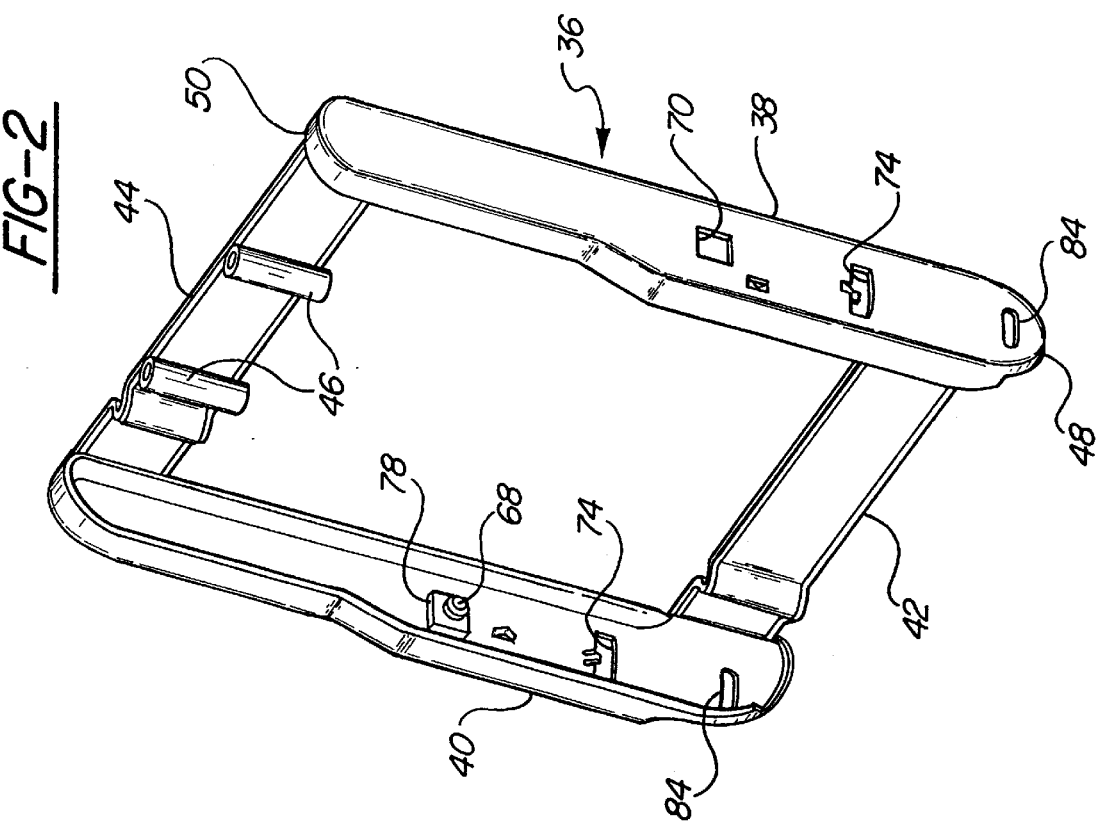
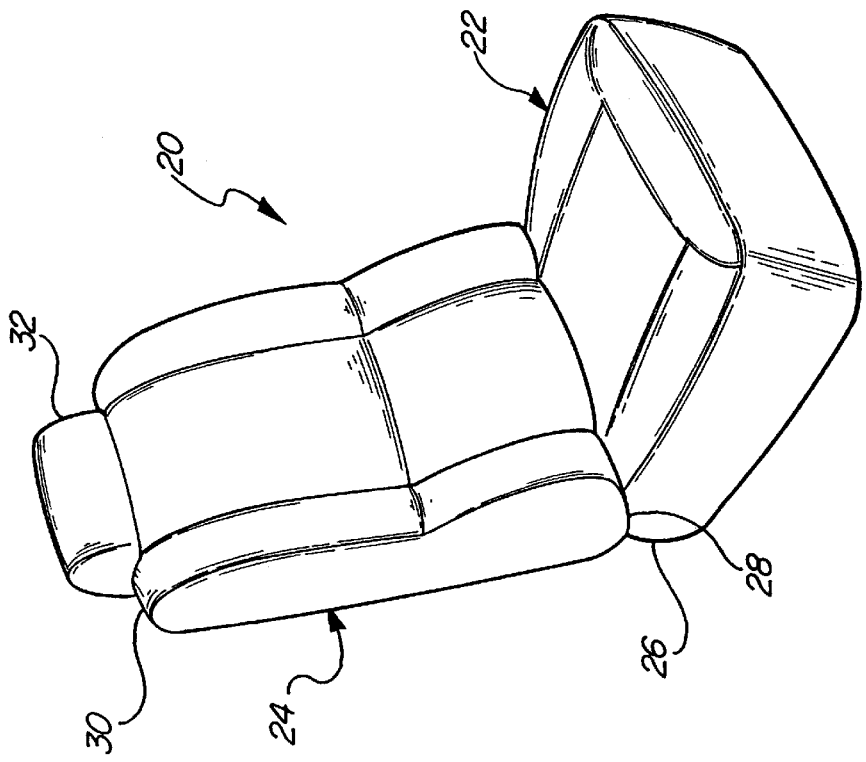

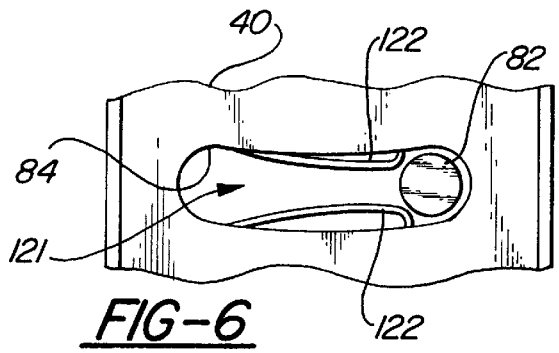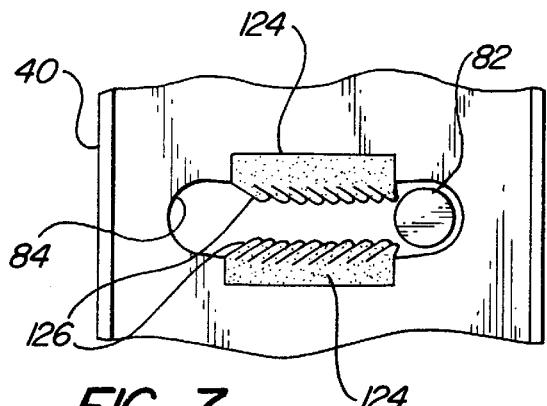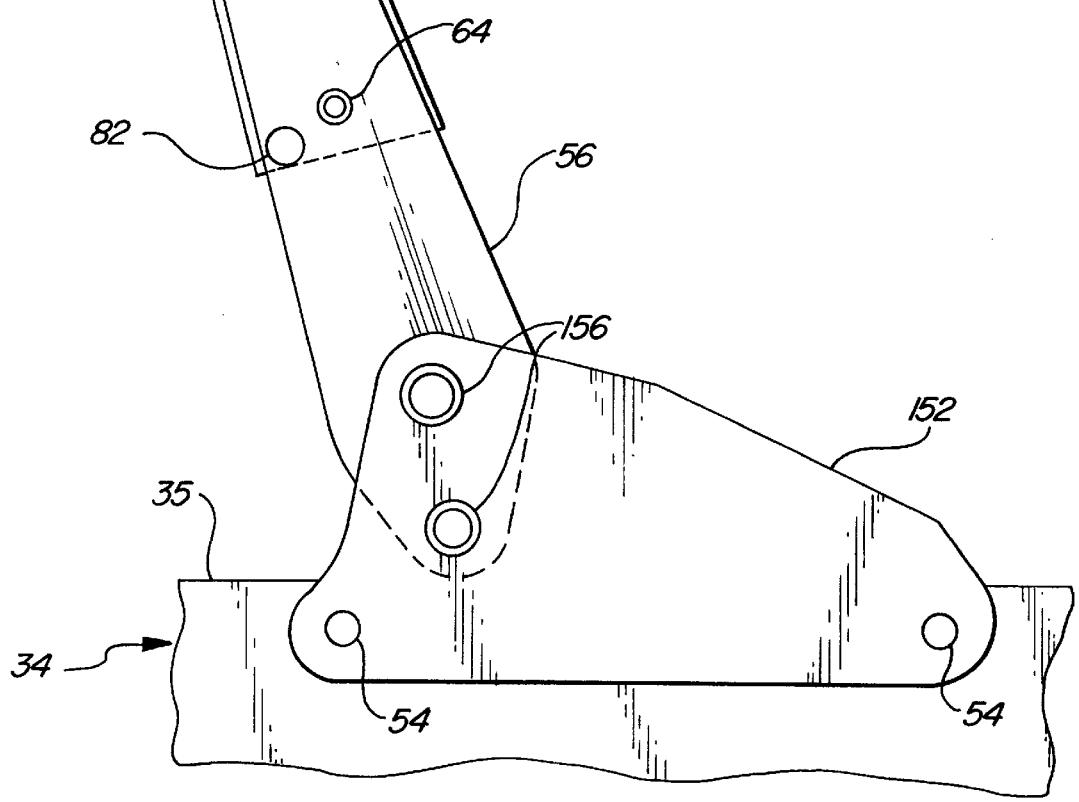

PIVOTING SEAT BACK

BACKGROUND AND SUMMARY OF THE INVENTION

The present invention relates to a seat back for a vehicle seat assembly and in particular to a seat back that pivots during a rear collision in such a manner that the upper end of the seat back rotates forward to reduce the spacing between the occupant's head and the seat head restraint.

Over the last several decades many features have been included in vehicles and vehicle seat assemblies to improve occupant protection during a vehicle collision. The present invention provides another such feature in a vehicle seat assembly. The seat back of the present invention pivots during a rear impact collision, regardless of occupant size and weight, to move the upper end of the seat back forward while the lower end of the seat back moves rearward.

The invention can generally be characterized as a vehicle seat assembly having a lower seat frame, a seat back frame with upper and lower ends, a pivot attaching the seat back frame to the lower seat frame for rotation of the seat back frame about a pivot axis defined by the pivot with the pivot axis being spaced above the lower end of the seat back frame. The seat assembly further includes a releasable latch mechanism operatively associated with the lower seat frame and the seat back frame to hold the seat back frame fixed in a predetermined position about the pivot axis. The latch mechanism is releasable by inertia forces in response to a rear collision, to release the latch mechanism and free the seat back frame for rotation about the seat back pivot axis.

Further objects, features and advantages of the invention will become apparent from a consideration of the following description and the appended claims when taken in connection with the accompanying drawings.

BRIEF DESCRIPTION OF THE DRAWINGS

FIG. 1 is perspective view of a vehicle seat assembly containing the pivoting seat back of the present invention;

FIG. 2 is a perspective view of the frame of the pivoting seat back of the present invention;

FIG. 6 is a side view of an energy absorber to absorb energy as the seat back rotates;

FIG. 7 is a side view of an alternative embodiment of an energy absorber;

FIG. 8 is a side elevational view of the lower seat frame without a recliner mechanism for adjusting the recline angle of the seat back.

DETAILED DESCRIPTION OF THE PREFERRED EMBODIMENT

Figure 3:
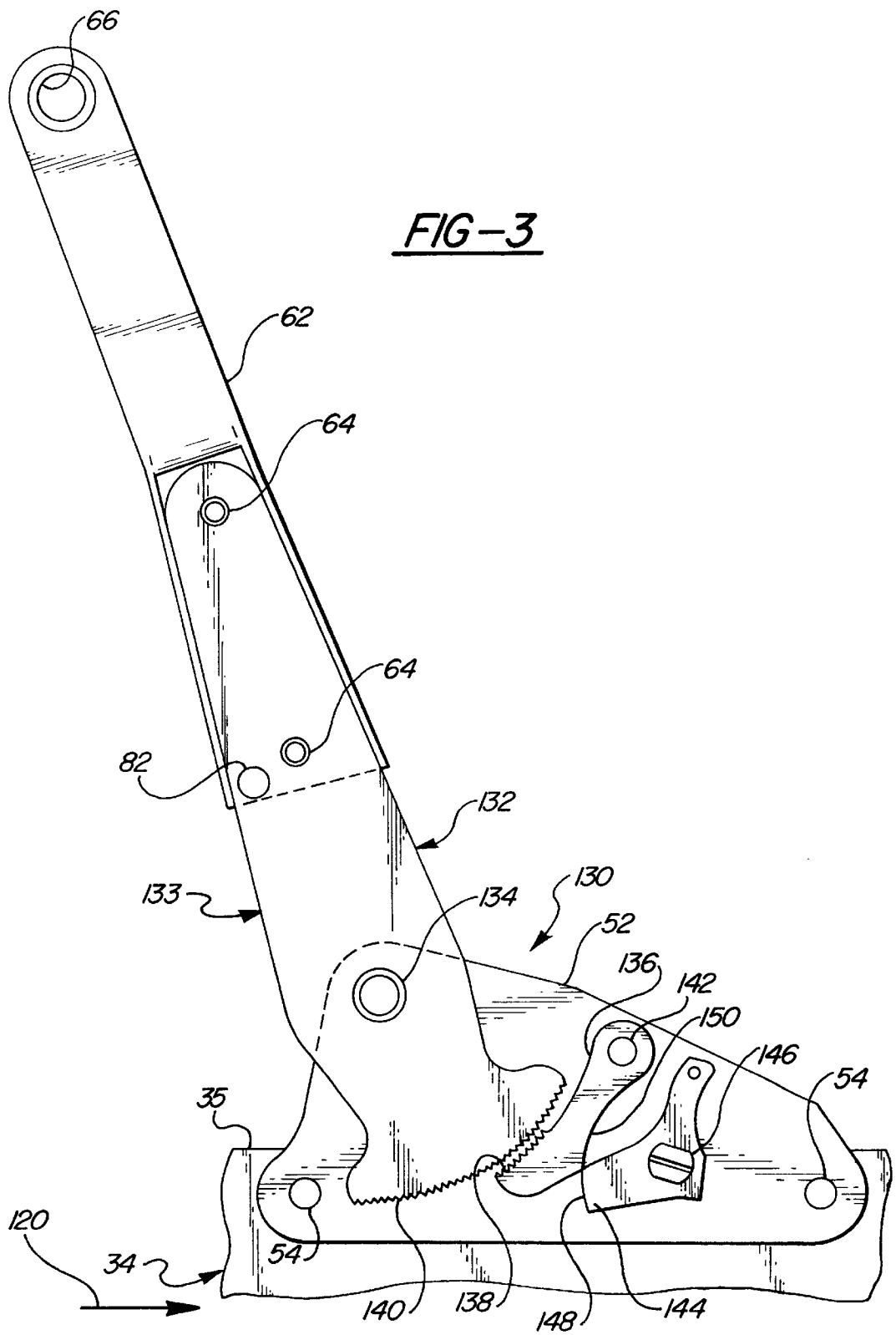
FIG. 3 is a side elevation view of the recliner plates to which the seat back of the pivoting seat back frame of the present invention is attached.

A seat assembly 20 is shown in FIG. 1 and contains the pivoting seat back of the present invention. Seat assembly 20 has a lower, generally horizontal seat cushion 22 and a seat back 24 extending generally upwardly at the rear end 26 of the seat cushion 22. The seat back 24 has a lower end 28 adjacent to the seat cushion 22 and extends upwardly therefrom to an upper end 30. A head restraint 32 is provided at the upper end 30 of the seat back. The head restraint 32 may be movable relative to the seat back 24 or may be fixed in position relative to the seat back and integrally formed therewith.

The seat back 24 includes a seat back frame 36 shown in FIG. 2. The seat back frame 36 includes a pair of upright members 38, 40 as well as a lower cross member 42 and an upper cross member 44. Bushings 46 are provided on the upper cross member for attachment of the head restraint 32. The seat back frame 36 has a lower end 48 and an upper end 50. The seat back frame structure illustrated in the figures is exemplary of many different types of seat back frame structures that can be employed with the present invention. The present invention is not limited to the specific seat back frame structure shown in the figures.

With reference to FIG. 3, a portion of a lower seat frame 34 is shown. The lower seat frame 34 includes a riser 35. A recliner plate 52 is attached to the riser 35 by fasteners 54. The recliner plate 52 is part of a recliner mechanism 130. The recliner plate is typically two plates of metal held together in a spaced relationship with various components of the recliner mechanism therebetween. The recliner mechanism 130 includes a lock-upper 132. The lock-upper 132 is pivotally mounted to the recliner plate 52 by a primary pivot 134. The lock-upper 132 is held in a fixed a position about the primary pivot 134 by a lock-lower 136. The lock-lower 136 is in the form of a pawl having teeth 138 which engage teeth 140 on the lower edge of the lock-upper 132 to fix the lock-upper 132 in a predetermined rotational position about the primary pivot 134. The lock-lower 136 is coupled to the recliner plate 52 by a pivot 142. The lock-lower is held in an engaged position with the lock-upper by a cam 144 which is also pivotally attached to the recliner plate 52 by a pivot 146. The cam 144 has a cam surface 148 which engages a surface 150 of the lock-lower 136 opposite the teeth 138. The lock-upper 132 is shown as a sector 133 with a sector extension 62 secured to the lock-upper 132 by fasteners 64 and extending upwardly therefrom. The lock-upper 132 is shown as two pieces, sector 133 and sector extension 62, for the purposes of packaging the invention into a seat back. It will be appreciated that the lock-upper 132 can be formed as single component if desired.

The recliner mechanism 130, as described, is a pawl and sector mechanism and is well known within the vehicle seating art. The pivoting seat back of the present invention is not limited to use with a pawl and sector type recliner mechanism but can be utilized with other types of manual recliners including, but not limited to, gear reduced recliners, linear recliners and rotary recliners. In addition, power recliner mechanisms having a lock-upper that is held in place about a primary pivot can be used with the pivoting seat back of the present invention as well. The pivoting seat back of the present invention can also be utilized with a fixed, non-reclining seat back.

The lower seat frame 34 can be constructed in a variety of manners. In a typical configuration, the lower seat frame includes a fixed track and a slide track forming a fore and aft adjuster for a seat assembly. The riser 35 is also part of the lower seat frame and is coupled to the slide track and typically extends upwardly therefrom. The frame or pan of the seat cushion 22 is attached to the riser to mount the seat cushion 22 to the lower seat frame. In addition, as described below, the seat back is attached to the riser through the recliner mechanism. It will be appreciated that other types of lower seat frame structures can be utilized with the pivoting seat back of the present invention as described herein.

Figure 4:
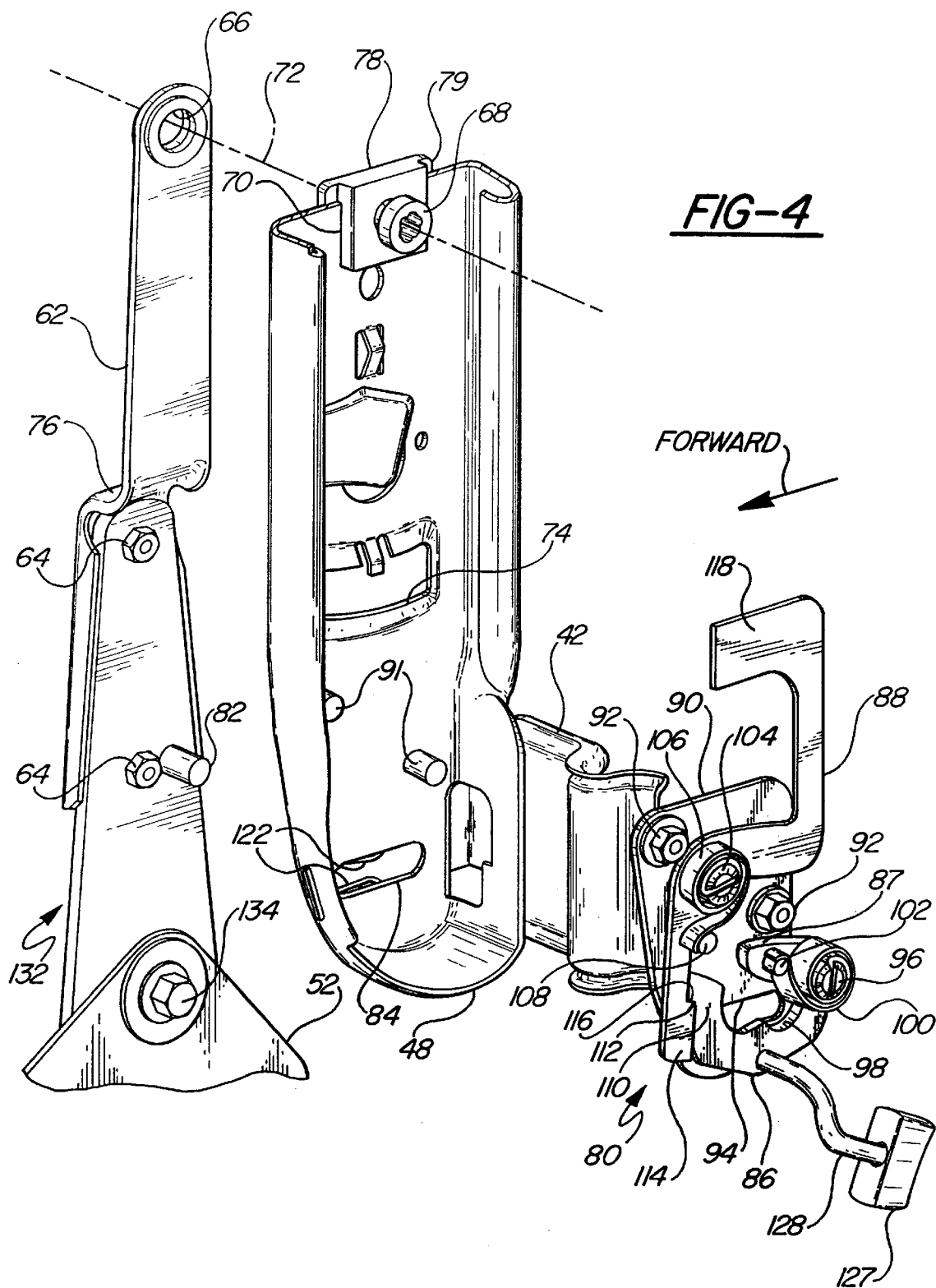
FIG. 4 is an exploded perspective view of the latch mechanism holding the seat back in a fixed rotational position relative to the recliner mechanism.
Figure 5:
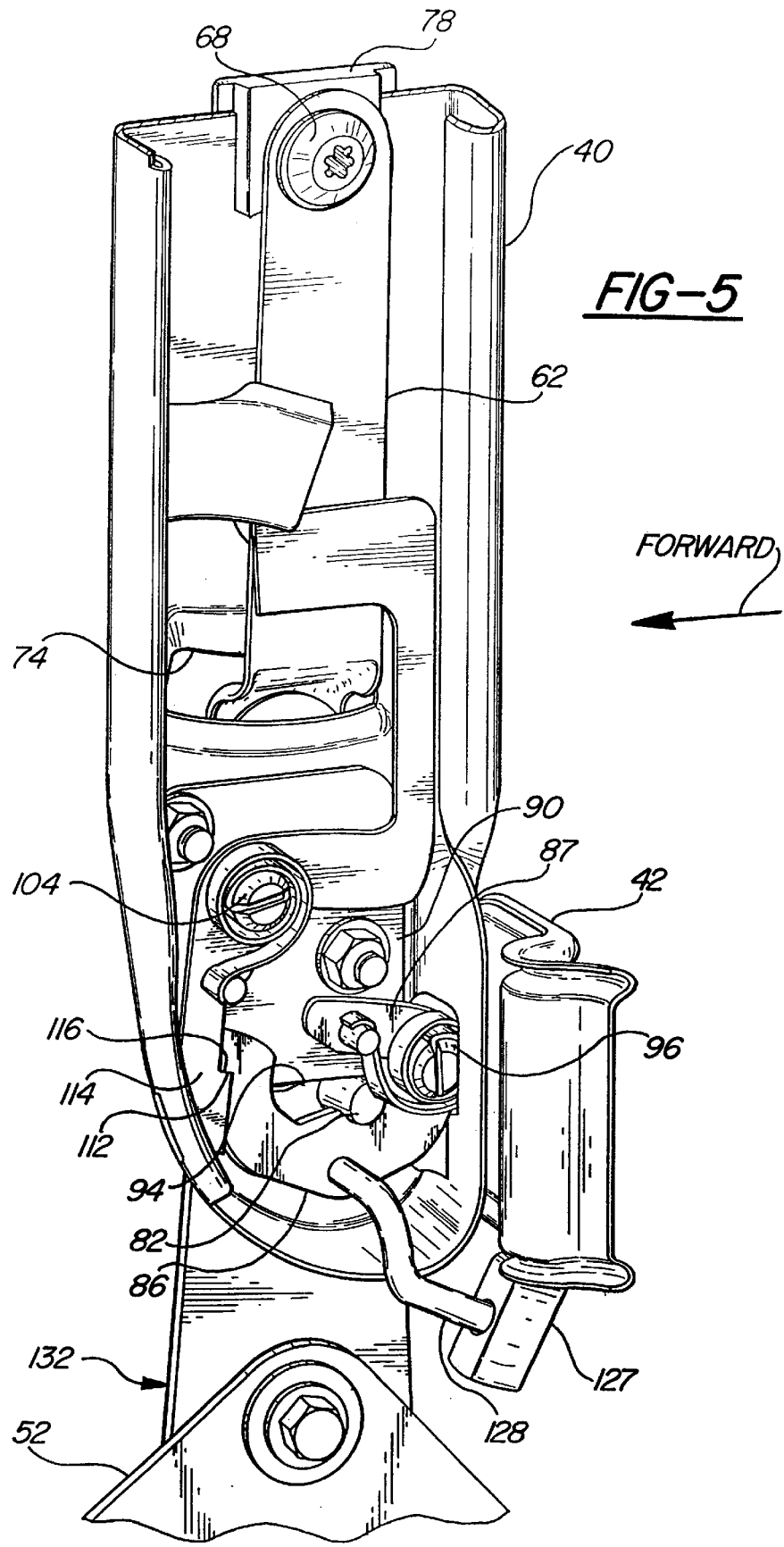
FIG. 5 is an assembled perspective view of the latch mechanism shown in FIG. 4.

With reference to FIGS. 4 and 5, the attachment of the seat back frame 36 to the lower seat frame 34 is shown. The sector extension 62 has an aperture 66 at the upper end which receives a pivot 68 to rotatably mount the seat back frame 36 to the sector extension. The seat back frame 36 is free to rotate about the pivot axis 72 formed by the pivot 68. The pivot 68 is a secondary pivot in that it provides a second pivot axis for the seat back, with the first or primary, pivot being the recliner pivot 134.

The upright member 40 of the seat back frame includes a slot 74. The sector extension 62 includes an inwardly bent transition portion 76 that passes through the slot 74 such that the sector extension 62, above the transition portion 76, is on the inboard side of the upright member 40.

The pivot 68 extends through the aperture 66 at the upper end of the sector extension 62 and into a threaded block or nut 78. The nut 78 is fitted into a square aperture 70 in the upright member 40. The nut 78 has an outer flange 79 to retain the nut in the aperture 70. The seat back frame 36 is pivotable about the pivot axis 72 defined by the pivot 68. The pivot 68 is preferably a shoulder bolt to provide for rotation of the seat back frame about the pivot 68 without applying the bolt clamping load to the seat back frame.

A releasable latch mechanism 80 is provided to secure the seat back frame 36 to the lock-upper 132 to prevent rotation of the seat back frame about the pivot axis 72. The latch mechanism 80 includes a striker 82 in the form of a pin protruding laterally from the lockupper 132. The striker 82 extends through a slot 84 in the upright member 40 to the inboard side of the upright member 40.

The latch mechanism 80 further includes a latch member 86 and a retaining pawl 88. The latch member 86 and retaining pawl 88 are pivotally carried by a plate 90, which is in turn fixed to the upright member 40 by threaded fasteners 91 and nuts 92. Other types of fasteners can be used including rivets, welding, etc., to attach the plate 90. The plate 90 includes a slot 94 generally aligned with the slot 84 in the upright member 40. The striker 82 extends through both the slot 84 and the slot 94. The angular extent of rotation of the seat back frame 36 is limited by the angular extent of the slot 84. As the seat back frame rotates, the slot 84 moves relative to the striker 82. Engagement of the two ends of the slot 84 with the striker 82 provides rotational stops for the seat back frame. In the event that excessive force is applied to the striker 82, causing the striker 82 to deform, the slot 74 in the upright member 40 of the seat back frame will engage the sector extension 62 to provide a secondary stop for rotation of the seat back frame.

The latch member 86 is rotatably mounted to the plate 90 on pivot post 96. The latch member 86 forms a hook portion 98 which engages and entraps the striker 82 between the hook portion 98 and one end of the slot 94. Entrapment of the striker 82 by the latch member 86 prevents rotation of the seat back frame 36 about the pivot axis 72.

The latch member 86 is shown in FIG. 5 in a latched position entrapping the striker 82. A torsion spring 100 on the pivot post 96 acts on a pin 102 protruding from the latch member 86 to bias the latch member 86 to rotate in a counterclockwise direction about the pivot post 96 as viewed in FIGS. 4 and 5 to a release position. In the release position, the hook portion 98 of the latch member is disengaged from the striker 82, thus releasing the latch mechanism 80 and freeing the seat back frame 36 for rotation. The latch member 86 is retained in the latched position by the retaining pawl 88. The retaining pawl 88 is pivotally mounted to a pivot post 104 and biased in a counterclockwise direction by a torsion spring 106 acting on a post 108 protruding from the retaining pawl 88. The latch member 86 has a hook 110 forming a downwardly facing ledge 112 at an end portion spaced from the pivot post 96. The retaining pawl 88 forms a complementary hook 114 with an upwardly facing ledge 116. The ledge 116 of the retaining pawl 88 engages the ledge 112 of the latch member 86 to hold the latch member 86 in the latched position in opposition to the torsion spring 100.

The retaining pawl 88 extends upwardly from the pivot post 104 and includes an upper mass 118 spaced above the pivot post 104 such that the center of gravity of the retainer pawl 88 is above the pivot post 104. During a rear impact collision, the forward acceleration of the vehicle produces a forwardly directed force acting on the seat assembly through the seat assembly attachment to the vehicle body. This forward directed force is shown by the arrow 120 in FIG. 3. The inertia of the mass 118 will cause the retaining pawl 88 to rotate in a clockwise direction, as viewed in FIGS. 4 and 5, in response the forward force 120. This rotation of the retaining pawl 88 disengages the retaining pawl ledge 116 from the ledge 112 of the latch member 86. When this occurs, the torsion spring 100 rotates the latch member 86 about the pivot post 96, releasing the striker 82 from its entrapment thus releasing the latch mechanism 80. The seat back frame 36 is then free to rotate about the pivot axis 72 of the pivot 68. The magnitude of the mass 118 and the force of torsion spring 106 are determined from the minimum impact force desired for release of the latch mechanism 80.

The pivot axis 72 is located above the lower end 48 of the seat back frame, approximately in the middle of the seat body between its lower and upper ends. If the seat assembly 20 is occupied by a seat occupant, the seat occupant inertia will produce a rearward reaction force applied to the seat back. The occupant inertia force is applied below the pivot axis 72 to cause the seat back frame to rotate in a manner that moves the upper portion of the seat back frame above the pivot axis 72, forward, while the lower portion of the seat back frame below the pivot axis 72 moves rearward.

The seat back frame 36 can be re-latched in the original predetermined position above the pivot axis 72. The seat back frame is first returned to the predetermined position and a reset button 127 is depressed. The reset button 127 is coupled to the latch member 86 by a rod 128. Pressing the reset button 127 forward causes the latch member 86 to rotate clockwise about the pivot post 96 in opposition to the torsion spring 100 to return the latch member to its latched position in which it entraps the striker 82. The latch member 86 includes an upper arm 87 which is located above the striker 82. When the latch is released, the upper arm 87 engages the striker 82 to limit the rotation of the latch member 86 in the release direction. The rotation of the latch member is limited such that in the release position the hook 110 of the latch member 86 does not move downward sufficiently to clear the hook 114 of the retaining pawl 88. Thus, when the reset button 127 is pressed moving the latch member 86 back to the latched position, the hook 110 of the latch member slides along the hook 114 of the retaining pawl until the ledge 112 of the latch member 86 reengages the ledge 116 of the retaining pawl 88.

With reference to FIG. 6, an energy absorber 121 is shown within the slot 84. The energy absorber 121 is in the form of a pair of deformable bridges 122 which extend into the slot 84 from the top and bottom edges of the slot 84. When the seat back frame rotates, the slot moves relative to the striker 82. The striker 82 deforms the bridges 122 toward the respective upper and lower edges of the slot 84. The bridges 122 can be formed as part of a plastic molded insert placed into the slot 84. The molded plastic can be resilient such that once the seat back is returned to the latched position, and the striker 82 is at one end of the slot 84, the bridges 122 assume their original positions shown in FIG. 6, where they are available to once again absorb energy by deformation.

An alternative embodiment of the energy absorber is shown in FIG. 7. There, the energy absorber is in the form of plastic molded inserts 124. The inserts have a plurality of resilient, deformable fingers 126. The fingers 126 are directed toward the striker 82 at one end of the slot 94 when the seat back frame is latched in a fixed position. The fingers must deform to allow the seat back frame 36 to rotate and move the slot 94 along the striker 82. Preferably, the fingers 126 are resilient to enable the fingers 126 to resume the original position shown in FIG. 7, once the seat back has been returned to the latched position.

An alternative embodiment of the present invention is shown in FIG. 8. In FIG. 8, the seat back frame 36 is coupled to the lower seat frame 34 through a fixed mounting arm 56. The mounting arm 56 is coupled to a mounting plate 152 by a pair of bolts or fasteners 156. The plate 152 is in turn attached to the riser 35 of the lower seat frame 34. An extension 158 extends upward from the mounting arm 56 and includes an aperture 160 for receiving the pivot 68 to rotatably mount the seat back frame thereto. The mounting arm 56 and extension 158 are fixed in a predetermined position relative to the lower seat frame 34. The seat back frame is mounted to the extension 158 and latched to the mounting arm 56 through a striker 82 in the same manner as described above in connection with FIGS. 4 and 5. FIG. 8 illustrates that the pivoting seat back of the present invention can be incorporated into a seat assembly that does not include a recliner mechanism if so desired. In many applications, a recliner mechanism will be included in the seat assembly but it is not an essential component in the present invention. In the claims that follow, the mounting arm and extension are referred to as a "fixed frame member". The recliner lock-upper 132 described above can also be referred to as a "fixed frame member" since it is fixed by the recliner mechanism.

Figure 9:
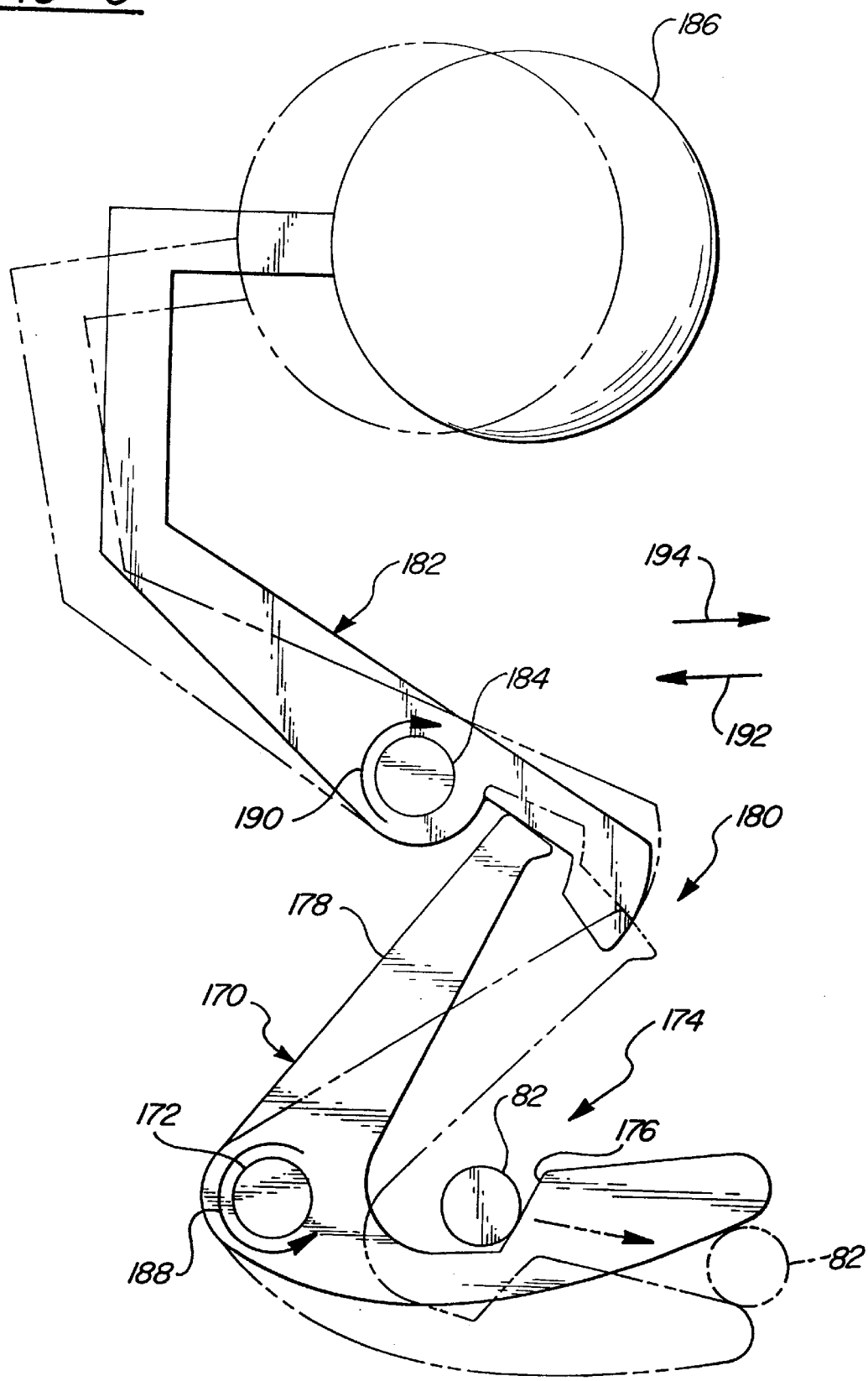
FIG. 9 is an alternative embodiment of the latch mechanism which is configured to relatch upon return of the seat back to the predetermined position.

With reference to FIG. 9, an alternative embodiment of the latch mechanism is shown. In FIG. 9, a latch member 170 is shown mounted to a pivot 172. The latch member 170 forms a hook portion 174 having a cam surface 176 which engages the striker 82 to entrap the striker 82 in the latched position. An upper arm 178 of the latch member 170 is received in a hook portion 180 of a retaining pawl 182. The retaining pawl 182 is mounted to a pivot 184 and includes a mass 186 spaced above the pivot 184. The pivots 172 and 184 are part of a mounting plate (not shown) such as the mounting plate 90 described above.

The latch member 170 is biased by a spring in a counterclockwise direction about the pivot 172 as shown by the arrow 188 to the latched position. This biases the cam surface 176 of the latch member into engagement with the striker 82. The retaining pawl 182 is in turn biased in the clockwise direction about the pivot 184 as shown by the arrow 190. The biasing members are not shown but can be torsion springs like those shown in FIGS. 4 and 5 or other types of springs if desired. The striker 82 is attached to the recliner mechanism lock-upper or the fixed mounting arm attached to the lower seat frame 34 as described above.

The occupant inertia force is applied to the lower end of the seat back, as shown by the arrow 192, and moves the pivot 172 to the left as viewed in FIG. 9, pressing the cam surface 176 of the latch member 170 against the striker 82. The cam surface 176 and the striker 82 are located such that the resulting moment applied to the latch member 170 will rotate the latch member 170 clockwise, in opposition to the biasing torque applied to the latch member. The retaining pawl 182, however, holds the latch member 170 in its latched position absent a rear impact collision. Such a collision force is shown by the arrow 194. A sufficient impact force will result in an inertia reaction force acting on the retaining pawl 182, causing the retaining pawl to rotate counter clockwise about the pivot 184 to a release position shown in phantom line. In this release position, the hook portion 180 of the retaining pawl 182 is released from the latch member 170, allowing the latch member to rotate to its release position in response to the force applied to the cam surface 176 by the striker 82. This releases the latch mechanism enabling rotation of the seat back as described above. The retaining pawl 182 holds the latch member 170 in the latch position during normal vehicle operation and rearward pressing on the seat back by a seat occupant. The latch member is never free to rotate under normal operating conditions.

The latch member 170 does not rotate far enough to clear the hook portion 180 of the retaining pawl 182. The full release position of both latch member 170 and the retaining pawl 182 are shown in phantom line in FIG. 9. The relative position of the striker 82 and latch member 170 in the release position and the rotated position of the seat back is shown by the phantom line striker 82.

The latch mechanism of FIG. 9 automatically resets upon return of the seat back to its predetermined latched position. Return of the seat back to its latch position moves the latch member 170 relative to the striker 82 such that the striker 82 is again seated in the hook portion 174 of the latch member engaging the cam surface 176. In this position, the biasing force shown by the arrow 188 returns the latch member 170 to the latched position. The biasing force shown by arrow 190 acting on the retaining pawl 182 then moves the retaining pawl back to its latched position. This embodiment of the latch mechanism avoids the need for a reset button 127 and the rod 128 as described above.

The latch mechanism 80 as been shown and described in which the striker 82 is mounted to the lock-upper or the fixed frame member and the latch members 86 or 170 are mounted to the seat back frame. It will be readily appreciated by those skilled in the art that the striker can be mounted to the seat back frame while the latch member is mounted to the fixed frame member or the recliner lock-upper.

The seat back of the present invention can utilize a single latch mechanism as described on side of the seat back frame. Alternatively, a dual sided mechanism can be provided with a latch mechanism on each side of the seat back frame, one on the upright member 38 and the other on the upright member 40 of the seat back frame 36.

It is to be understood that the invention is not limited to the exact construction illustrated and described above, but that various changes and modifications may be made without departing from the spirit and scope of the invention as defined in the following claims.

We claim:

1. A vehicle seat assembly comprising:
   a fixed frame member;
   a seat back frame having an upper end and a lower end;
   a pivot attaching said seat back frame to said fixed frame member for rotation of said seat back frame about a pivot axis defined by said pivot, said pivot axis being spaced above said lower end of said seat back frame; and a releasable latch mechanism operatively associated with said fixed frame member and said seat back frame to hold said seat back frame fixed in a predetermined position about said pivot axis, said latch mechanism including an inertia pendulum, whereby said latch mechanism is releasable by inertia forces to release said latch mechanism and free said seat back frame for rotation about said pivot axis.

2. The vehicle seat assembly as defined in claim 1 further comprising an energy absorber to absorb energy as said seat back frame rotates about said pivot axis.

3. The vehicle seat assembly as defined in claim 2 wherein said energy absorber includes at least one resilient deformable member which deforms to absorb energy and subsequently returns to an original position whereby said energy absorber can be reused to absorb energy.

4. The vehicle seat assembly as defined in claim 1 further comprising a reset mechanism to relatch said latch mechanism after said seat back frame has been returned to said predetermined position to fix said seat back frame in said predetermined position about said pivot axis.

5. The vehicle seat assembly as defined in claim 4 wherein said latch mechanism automatically relatches upon return of said seat back frame to said predetermined position about said pivot axis.

6. The vehicle seat assembly as defined in claim 1 wherein said latch mechanism includes a striker mounted to one of said fixed frame member and said seat back frame, a latch member mounted to the other of said fixed frame member and said seat back frame having a hook portion to engage and entrap said striker in a latched position of said latch member, said latch member being movable to a release position disengaged from said striker to release said latch mechanism and free said seat back frame for rotation about said pivot axis.

7. The vehicle seat assembly as defined in claim 6 wherein said other of said fixed frame member and said seat back frame includes a slot through which said striker extends and which moves as said scat back frame rotates about said pivot axis, said slot having a first end which cooperates with said hook portion of said latch member to entrap said striker.

8. The vehicle scat assembly as defined in claim 7 further comprising an energy absorber disposed along said slot and engaged by said striker as said slot moves over said striker.

9. The vehicle scat assembly as defined in claim 8 wherein said energy absorber includes at least one deformable member which deforms to absorb energy said slot moves over said striker.

10. The vehicle scat assembly as defined in claim 9 wherein said deformable member is resilient to subsequently return to an original position whereby said energy absorber can be reused to absorb energy.

11. The vehicle seat assembly as defined in claim 6 wherein said latch mechanism further comprises a biasing member acting on said latch member to urge said latch member to said release position and a retaining pawl engaged by said latch member to hold said latch member in said latched position, said latch mechanism being releasable by movement of said retaining pawl away from said latch member whereby said biasing member moves said latch member to said release position to allow said seat back frame to rotate.

12. The vehicle scat assembly as defined in claim 11 wherein said retaining pawl is an inertia pendulum which moves away from said latch member in response to said rear collision thereby releasing said latch mechanism.

13. The vehicle scat assembly as defined in claim 12 further comprising a second biasing member acting on said retaining pawl to urge said retaining pawl to engage said latch member.

14. The vehicle scat assembly as defined in claim 6 wherein said striker protrudes from said fixed frame member and said latch member is mounted to said seat back frame.

15. The vehicle seat assembly as defined in claim 6 wherein said latch member is biased to said latched position.

16. The vehicle seat assembly as defined in claim 6 wherein said latch member is biased to said release position.

17. A vehicle seat assembly comprising:

a lower seat frame;

a seat back frame having upper and lower ends;

a recliner mechanism coupling said seat back frame to said lower seat frame, said recliner mechanism including a lock-upper coupled to said lower seat frame by a primary pivot for rotation of said lock-upper about said primary pivot, said recliner mechanism further including a lock-lower for fixing said lock-upper in an adjusted rotational position relative to said lower scat frame, said scat back frame being rotatably coupled to said lock-upper by a secondary pivot spaced above said lower end of said seat back frame; and a releasable latch mechanism operatively associated with said lock-upper and said seat back frame to hold said seat back frame fixed in a predetermined position about said secondary pivot, said latch mechanism being releasable by inertia forces to release said latch mechanism and free said seat back frame for rotation about said secondary pivot.

18. The vehicle seat assembly as defined in claim 17 wherein said latch mechanism is releasable by inertia forces resulting from said forward directed force acting on said seat assembly.

19. The vehicle seat assembly as defined in claim 18 wherein said energy absorber includes at least one resilient deformable member which deforms to absorb energy and subsequently returns to an original position whereby said energy absorber can be reused to absorb energy.

20. The vehicle seat assembly as defined in claim 17 further comprising a reset mechanism to relatch said latch mechanism after said seat back frame has been returned to said first rotational position to fix said seat back frame in position about said secondary pivot.

21. The vehicle seat assembly as defined in claim 17 wherein said latch mechanism automatically relatches upon return of said seat back frame to said predetermined position about said secondary pivot.

22. The vehicle seat assembly as defined in claim 17 wherein said latch mechanism includes a striker mounted to one of said lock-upper and said seat back frame, a latch member mounted to the other of said lock-upper and said seat back frame and having a hook portion to engage and entrap said striker in a latched position of said latch member, said latch member being movable to a release position disengaged from said striker to release said latch mechanism and free said seat back frame for rotation about said secondary pivot.

23. The vehicle seat assembly as defined in claim 22 wherein said other of said lock-upper and said seat back frame includes a slot through which said striker extends and which moves over said striker as said seat back frame rotates about said secondary pivot, said slot having a first end which cooperates with said hook portion of said latch member to entrap said striker.

24. The vehicle seat assembly as defined in claim 23 further comprising an energy absorber disposed along said slot and engaging by said striker as said slot moves over said striker.

25. The vehicle seat assembly as defined in claim 24 wherein said energy absorber includes at least one deformable member which deforms to absorb energy as said slot moves over said striker.

26. The vehicle seat assembly as defined in claim 25 wherein said deformable member is resilient to subsequently return to an original position whereby said energy absorber can be reused to absorb energy.

27. The vehicle seat assembly as defined in claim 23 wherein said latch mechanism further comprises a biasing member acting on said latch member to urge said latch member to said release position and a retaining pawl engaged by said latch member to hold said latch member in said latched position, said latch mechanism being releasable by movement of said retaining pawl away from said latch member whereby said biasing member moves said latch member to said release position to release said striker and free said seat back frame for rotation about said secondary pivot.

28. The vehicle seat assembly as defined in claim 27 wherein said retaining pawl is an inertia pendulum which moves away from said latch member in response to said rear collision thereby releasing said latch mechanism.

29. The vehicle seat assembly as defined in claim 28 further comprising a second biasing member acting on said retaining pawl to urge said retaining pawl into engagement with said latch member.

30. The vehicle seat assembly as defined in claim 23 wherein said striker protrudes from said lock-upper and said latch member is mounted to said seat back frame.

31. The vehicle seat assembly as defined in claim 23 wherein said latch member is biased to said latched position.

32. The vehicle seat assembly as defined in claim 23 wherein said latch member is biased to said release position.

33. The vehicle seat assembly as defined in claim 17 wherein said latch mechanism includes an inertia pendulum movable in response to said rear collision to release said latch mechanism.

34. A vehicle seat assembly comprising:
a fixed frame member;
a seat back frame having an upper end and a lower end;
a pivot attaching said seat back frame to said fixed frame member for rotation of said seat back frame about a pivot axis defined by said pivot, said pivot axis being spaced above said lower end of said seat back frame;
an energy absorber operatively associated with said fixed frame member and said seat back frame to absorb energy as said seat back frame rotates about said pivot axis, said energy absorber including at least one resilient deformable member which deforms to absorb energy and subsequently returns to a substantially original position whereby said energy absorber can be reused to absorb energy; and
a releasable latch mechanism operatively associated with said fixed frame member and said seat back frame to hold said seat back frame fixed in a predetermined position about said pivot axis, said latch mechanism being releasable by inertia forces to release said latch mechanism and free said seat back frame for rotation about said pivot axis.

35. The vehicle seat assembly as defined in claim 34 wherein said at least one resilient deformable member is selected from the group consisting of at least one deformable bridge and at least one plastic molded insert.

36. The vehicle seat assembly as defined in claim 35 wherein said at least one plastic molded insert includes at least one resilient deformable finger.

37. A vehicle seat assembly comprising:
a fixed frame member;
a seat back frame having an upper end and a lower end;
a pivot attaching said seat back frame to said fixed frame member for rotation of said seat back frame about a pivot axis defined by said pivot, said pivot axis being spaced above said lower end of said seat back frame;
a releasable latch mechanism operatively associated with said fixed frame member and said seat back frame to hold said seat back frame fixed in a predetermined position about said pivot axis, said latch mechanism being releasable by inertia forces to release said latch mechanism and free said seat back frame for rotation about said pivot axis; and
a reset mechanism to relatch said latch mechanism after said seat back frame has been returned to said predetermined position to fix said seat back frame in said predetermined position about said pivot axis.

38. The vehicle seat assembly as defined in claim 37 wherein said latch mechanism automatically relatches upon return of said seat back frame to said predetermined position about said pivot axis.

39. A vehicle seat assembly comprising:
a fixed frame member;
a seat back frame having an upper end and a lower end;
a pivot attaching said seat back frame to said fixed frame member for rotation of said seat back frame about a pivot axis defined by said pivot, said pivot axis being spaced above said lower end of said seat back frame; and
a releasable latch mechanism operatively associated with said fixed frame member and said seat back frame to hold said seat back frame fixed in a predetermined position about said pivot axis, said latch mechanism including a striker mounted to one of said fixed frame member and said seat back frame, a latch member mounted to the other of said fixed frame member and said seat back frame having a hook portion operable to engage and entrap said striker in a latched position of said latch member, wherein said latch member is movable by inertia forces to a release position disengaged from said striker to release said latch mechanism and free said seat back frame for rotation about said pivot axis.

40. The vehicle seat assembly as defined in claim 39 wherein said other of said fixed frame member and said seat back frame includes a slot through which said striker extends and which moves as said seat back frame rotates about said pivot axis, said slot having a first end which cooperates with said hook portion of said latch member to entrap said striker.

41. The vehicle seat assembly as defined in claim 40 further comprising an energy absorber disposed along said slot and engaged by said striker as said slot moves over said striker.

42. The vehicle seat assembly as defined in claim 41 wherein said energy absorber includes at least one deformable member which deforms to absorb energy said slot moves over said striker.

43. The vehicle seat assembly as defined in claim 42 wherein said deformable member is resilient to subsequently return to a substantially original position whereby said energy absorber can be reused to absorb energy.

44. The vehicle seat assembly as defined in claim 39 wherein said latch mechanism further comprises a biasing member acting on said latch member to urge said latch member to said release position and a retaining pawl engaged by said latch member to hold said latch member in said latched position, said latch mechanism being releasable by movement of said retaining pawl away from said latch member whereby said biasing member moves said latch member to said release position to allow said seat back frame to rotate.

45. The vehicle seat assembly as defined in claim 44 wherein said retaining pawl is an inertia pendulum which moves away from said latch member thereby releasing said latch mechanism, said releasable latch mechanism including a second biasing member acting on said retaining pawl to urge said retaining pawl to engage said latch member.

46. The vehicle seat assembly as defined in claim 39 further comprising a reset mechanism to relatch said latch mechanism after said seat back frame has been returned to said predetermined position to fix said seat back frame in said predetermined position about said pivot axis.

* * * * *